Nov. 3, 1970  O. F. ANDERSON  3,537,714
CHUCKING FIXTURE ASSEMBLY
Filed Jan. 2, 1968  2 Sheets-Sheet 1
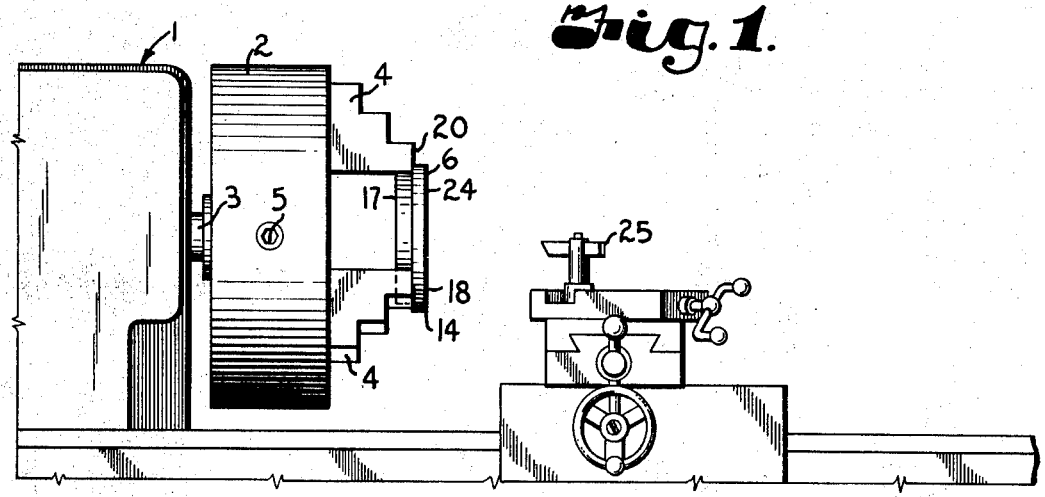
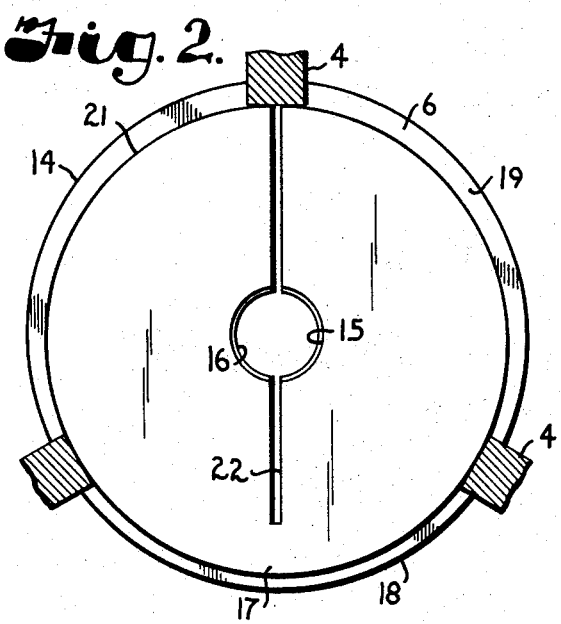
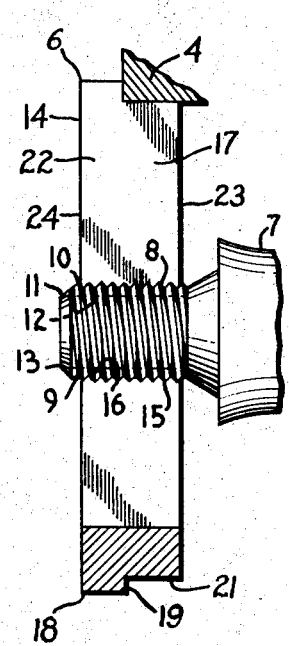
INVENTOR.
OTIS F. ANDERSON
BY
Fishburn, Gold & Litman
ATTORNEYS Nov. 3, 1970  O. F. ANDERSON  3,537,714
CHUCKING FIXTURE ASSEMBLY
Filed Jan. 2, 1968  2 Sheets-Sheet 2
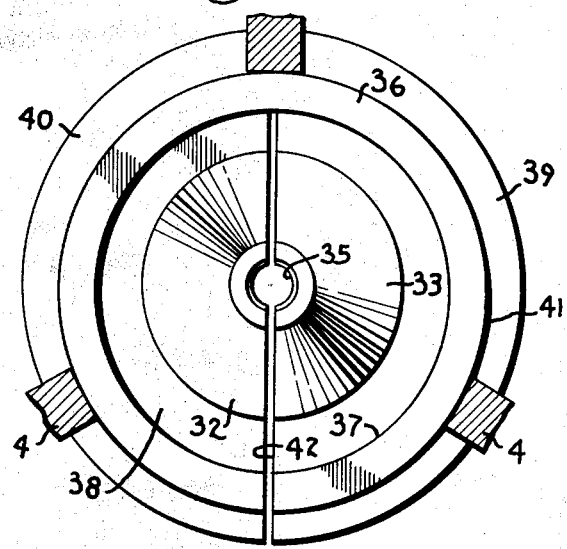
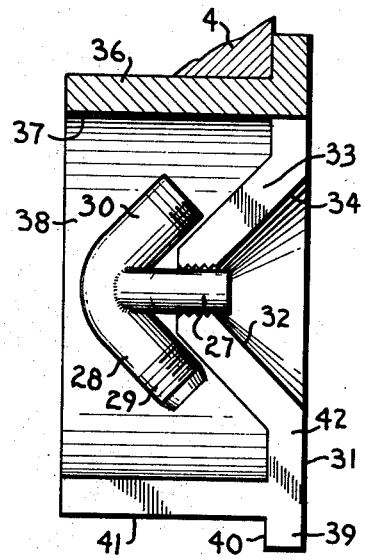
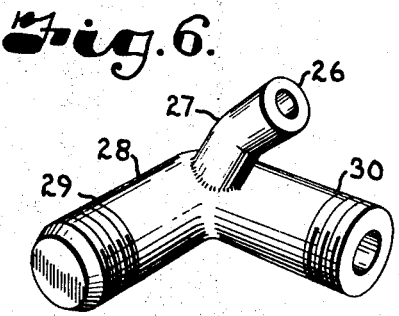
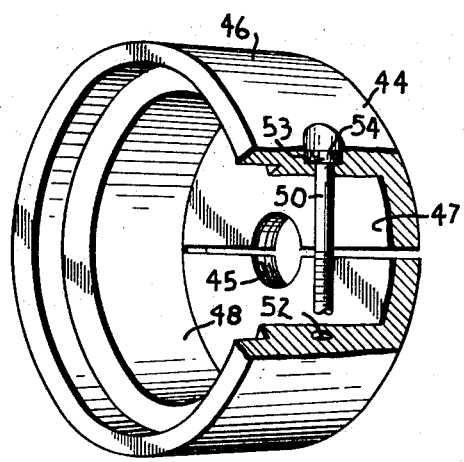
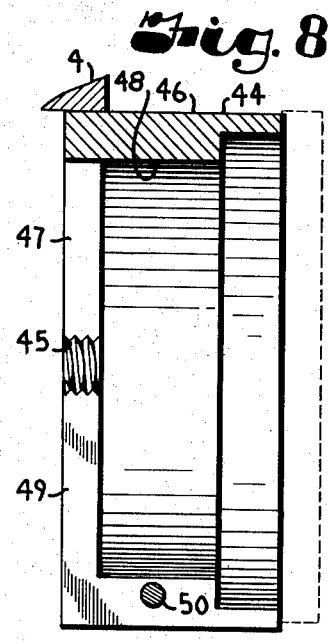
INVENTOR.
OTIS F. ANDERSON
BY
Fishburn, Gold & Litman
ATTORNEYS

United States Patent Office

3,537,714
Patented Nov. 3, 1970

3,537,714
CHUCKING FIXTURE ASSEMBLY
Otis F. Anderson, R.R. 3, Winfield, Kans. 67156
Filed Jan. 2, 1968, Ser. No. 695,172
Int. Cl. B23b 5/24, 31/20, 31/36
U.S. Cl. 279—6                                8 Claims

ABSTRACT OF THE DISCLOSURE

A chucking fixture assembly for centering workpieces for axial rotation of portion during working and having a collet member and a turning machine chuck, the collet member having a wall portion defining an axial bore with surfaces substantially corresponding to workpiece portions to be received and clamped therein. The collet member wall has a shoulder for engaging the chuck to limit axial movement of the collet member therein, the shoulder extends substantially radially outwardly from a collet portion that has a cylindrical outer peripheral surface eccentric to said bore with a slot for the length of the collet member extending from the outer periphery diametrically through and beyond the axial bore, the slot being in a radial plane substantially from the point of greatest eccentricity. The eccentric surface is engaged in the chuck and compressed thereby to clamp and retain the workpiece with a portion of the wall defining the axial bore being positioned and of a length whereby the workpiece portion to be worked extends from said bore for suitable engagement by a working tool.

---

The present invention is particularly adapted for reworking parts such as flared fittings and the like that become damaged in use and which heretofore usually have been discarded because of the time and expense in mounting them in a machine and truing or refinishing the distorted portions. The present invention provides an economical chucking fixture with a chuck or clamping device used on lathes and other machines in which the chucks or clamping devices are rotated about a spindle axis or the like, and is particularly adapted for use in such clamping devices as the common type geared scroll chuck sometimes called a universal chuck and commonly having three jaws which are moved simultaneously to and from clamping positions.

The principal objects of the present invention are to provide a chucking fixture assembly having a work receiving member in which the portion to be worked is on a longitudinal axis and an eccentric portion engaged by a rotating clamping structure whereby relative rotation will provide easy and ready adjustment centering the workpiece on the rotating axis; to provide such a chucking fixture wherein the wall containing the axial bore includes an integral generally cylindrical wall having the eccentric surface and shaped to cooperate in supporting and accommodating multiple branch fittings and the like for truing flared or seal portions thereof; to provide such a chucking fixture with a slot extending from the periphery through the axial bore whereby clamping in the chuck compresses the work holding member to grip the workpiece positioned in the bore; to provide such a structure wherein the bore is internally threaded to accommodate threaded branches of fittings and the like; and to provide such chucking fixtures which may be easily and economically manufactured and yet provide precise adjustment of the workpiece to a centered axial position.

Other objects and advantages of this invention will become apparent from the following description taken in connection with the accompanying drawings wherein are set forth by way of illustration and example certain embodiments of this invention.

FIG. 1 is a side elevation of a lathe with the chucking fixture held in a three jaw chuck.
FIG. 2 is a sectional view through the chuck of FIG. 1 showing the inner end of the chucking fixture.
FIG. 3 is a transverse sectional view through the chucking fixture with the workpiece positioned therein.
FIG. 4 is an end elevation of a modified form of chucking fixture.
FIG. 5 is a sectional view through the modified form of chucking fixture.
FIG. 6 is a perspective view of a fitting having a central branch adapted to be accommodated by the chucking fixture shown in FIGS. 4 and 5.
FIG. 7 is a perspective view of a modified form of chuck.
FIG. 8 is a transverse sectional view through the chuck taken on the line 8—8 of FIG. 7.

Referring more in detail to the drawings:

In accordance with the present invention the chucking fixtures are adapted to be used on any suitable machine tool having a spindle or other mounting for a chuck or clamping member for receiving the workpiece holding member and is particularly adapted for use on machine tools such as lathes 1 having a suitable chuck 2 carried on a rotatable spindle 3, said chuck having a plurality of jaws 4 movable radially thereon. An example of a suitable chuck is a common type geared scroll chuck in which a control member 5 is rotated to effect the movement of the jaws 4 into and out of clamping engagement with a piece to be held therein. Such a chuck preferably has three jaws 4 spaced substantially equally from the axial center of the chuck.

The workpiece holding member or collet member 6 may vary in shape and size for accommodating particular shapes and sizes of workpieces and in the form of the invention illustrated in FIGS. 1 to 3, inclusive, the collet member 6 is particularly for receiving a workpiece in the form of a flared fitting or the like 7 having a branch 8 with external screw threads 9 thereon. At the free end of the branch 8 in the illustrated structure there preferably is a cylindrical portion 10 terminating in a beveled or tapered seat portion 11. In such fittings the branch has a bore 12 that cooperates with the tapered portion 11 in forming a thin edge 13. The work holder or collet 6 in the illustrated structure has a wall 14 substantially in the form of a disk provided with a bore 15 extending longitudinally therethrough, the inner surface of the bore substantially corresponding to the size and shape of the portion of the workpiece to be received therein and in the illustrated structure has internal screw threads 16 that correspond to the screw threads 9 of the fitting 7.

The collet has a portion 17 that extends between the jaws 4 and is adapted to be gripped thereby. This portion is of reduced size whereby the wall or disk-like member has an outwardly extending portion or flange 18 that provides a shoulder 19 adapted to engage the outer face 20 of the jaws to limit the movement of the collet axially inwardly in the chuck. In the structure illustrated the disk or wall portion that defines the flange 18 is substantially cylindrical and the bore 15 is substantially centered relative thereto. The portion 17 is machined to provide an external cylindrical peripheral surface 21 that is eccentric of the axis of the bore 15.

The collet 6 has a slot 22 for the length thereof that extends from the periphery substantially diametrically through and beyond the bore 15, and in the illustrated structure, said slot extends in a plane through a line in the surface 21 that is furthest from the axis of the bore 15 and extends beyond said bore for approximately 60 to 85% of the distance from the bore to the eccentric surface 21 on the other side of the bore, as illustrated in FIG. 2. As an example of the eccentricity of the peripheral surface 21, it is preferred that the axis thereof be offset from the axis of the bore 15 in the nature of .005 of one inch.

In making a collet structure, as illustrated in FIGS. 1 to 3, inclusive, a cylindrical disk is cut and opposed inner and outer faces 23 and 24, respectively, are machined to provide the desired thickness or length of the threaded bore. Then, the disk is provided with the slot 22. After slotting, a suitable wedge or spreader is inserted in the open end of the slot and then the bore or hole 15 is formed in the disk and threaded. After forming the threaded bore, the disk is offset in a direction toward the closed end of the slot for approximately .005" and then machined to provide the eccentric surface 21 and the shoulder 19. The disk is removed from the lathe and the spreader removed from the slot 22 and the collet 6 is then ready for use. In its relaxed or free condition with the spreader removed and no workpiece in the bore, the peripheral surface and the bore in the collet are out-of-round or oval. A ferrule or other fitting with a branch 8 to be reworked is threaded into the threaded bore 15 whereby the branch extends therethrough with the end 11 to be reworked extending beyond the outer surface 24. The collet with the fitting mounted therein is then placed in the chuck 2 whereby the shoulder 19 engages the surface 20 of the jaws and the portion 17 is between the jaws. It is preferred that in a three jaw chuck the jaws be arranged as illustrated in FIG. 2 and on operation of the chuck to move the jaws 4 into clamping engagement with the eccentric surface 21, the force of the jaws compress the collet causing the slot 22 to contract thereby tightening the threads 16 of the collet into gripping engagement with the threads of the fitting 7. The chuck is then rotated to determine if the fitting portion is centered or axially positioned relative to the axis of rotation, and if it is not, the rotation is stopped and the chuck actuated to loosen the jaws to permit relative rotation of the collet 6 in the chuck 2 to a position that would appear to center the fitting branch 8. The jaws 4 are again tightened and the chuck 2 rotated again to check the centering of the fitting. This can be repeated until the fitting is clamped and in a position wherein it is on the axis of the rotation of the chuck 2. With a little experience these trials and adjustments are quickly made and only a few required.

After the portion of the fitting 7 to be worked is centered, the machine is operated to turn the chuck 2 and a suitable tool 25 moved to engage the fitting to refinish same whereby it is restored to usefulness.

The collets or holding devices can be of various shapes and sizes to accommodate various workpieces and the bores can vary in size and the wall in thickness to accommodate different diameters and lengths of branches of fittings and the like to be reworked. Also, the outer face 24 of the wall can be recessed to facilitate access to the portions of the fitting to be machined. In the form of the invention illustrated in FIGS. 5 and 6, the collet is of a shape to handle the machining of the end 26 of a branch 27 of a fitting 28 that presents portions whereby the collet must be of a different shape than that shown in FIGS. 1 to 3, inclusive. The fitting 28 has branches 29 and 30 arranged generally in the form of an L, which branches 29 and 30 could be held in a disk shaped collet or the like but due to the branch 27 being inclined relative to the branches 29 and 30, the collet for holding the branch 27 during reworking has a wall 31 with a portion 32 offset inwardly therefrom, the portion 32 being connected to the outer portion by means of a conical wall portion 33 which forms a conical recess 34 for access to the outer end of the fitting portion mounted in a threaded bore 35 in the offset portion 32 of the wall. Integral with, and extending from, the wall portion 31 in the same direction as the offset is a peripheral wall 36, the inner surface 37 thereof cooperating with the wall and offset portion to form a cup shape cavity 38 of suitable size whereby when the branch 27 is threaded in the bore 35 the branches 29 and 30 are within the cavity and extend into the recess between the wall portion 33 and the surface 37. There is a radially outwardly extending flange 39 which is machined to present a shoulder 40 to be engaged by the surface 20 of the chuck jaws 4 and the outer surface 41 of the wall 36 is machined to be eccentric to the axis of the bore 35, in the same manner as the surface 21 is eccentric to the bore 15 in the form of the invention illustrated in FIGS. 1 to 3, inclusive. A slot 42 extends for the length of the collet and diametrically thereof in a plane from the point of greatest eccentricity or spacing from the axis of the bore 35 to approximately the inner surface of the wall 36 on the opposite side of the bore. The collet shown in FIGS. 5 and 6 is machined substantially in the same manner as described relative to the form shown in FIGS. 1 to 3, inclusive, and in use the fitting is applied and the collet mounted within the jaws of the chuck whereby said jaws will engage the surface 41 and on tightening the jaws the collet is compressed to grip the portion of the fitting to be refinished.

It is to be understood that other forms of chucks may be utilized and in FIGS. 7 and 8, there is such a chuck in the form of a cup shaped member 44 having a threaded bore 45 for mounting on a conventional spindle of a lathe or the like. The chuck has a generally cylindrical wall portion 46 extending outwardly from a wall 47 and provided with a bore 48, one side of the wall 46 is slotted as at 49 with the slot spread when the bore 48 is machined. A clamping screw 50 extends across the slotted portions and has a threaded shank threaded into a threaded bore 52 on one side and head 53 engaging a shoulder 54 of a recess on the other side whereby the sides of the cylindrical wall 26 are drawn together. In use, the eccentric portion of the collet is inserted into the bore 48 and the screw 50 tightened to clamp said collet therein, the bore 48 being axially of the spindle so that it serves in substantially the same manner as the jaws of the universal type chuck 2 in holding work holders or collets during machining of fittings and the like.

It is to be understood that while I have illustrated and described certain forms of my invention, it is not to be limited to the specific form or arrangement of parts herein described and shown.

What I claim and desire to secure by Letters Patent is:

1. A chucking fixture for workpieces for centering same during truing operations comprising,
    (a) a collet having an axial bore through the center thereof,
    (b) a chuck engaging portion of reduced diameter extending axially from one face of the collet and having a peripheral surface eccentric with respect to the bore,
    (c) a slot through said collet extending diametrically from adjacent one edge thereof through the opposite edge,
    (d) said bore and said peripheral surface being generally oval when said collet is in its unstressed or free state and said bore and said peripheral surface being cylindrical when said slot is spread apart a predetermined amount to receive a workpiece in said bore,
    (e) said eccentric peripheral surface enabling ready axial centering of a workpiece to be received in said bore by relative rotation of said collet in a chuck in which said collet is adapted to be received.

2. A chucking fixture as set forth in claim 1 and including
    (a) a rotatably mounted chuck having portions substantially equally spaced from the axis and movable to engage the said collet peripheral surface and compress the collet member, concentricity of a workpiece to be held in said collet being adjustable relative to the true center of chuck rotation by rotation of the collet member relative thereto.

3. A chucking fixture as set forth in claim 2 wherein the collet member has a wall with an axially offset portion with the bore positioned therein, and has an integral cylindrical wall extending from the first named wall and spaced outwardly from the offset portion to define a cavity for receiving the fitting to be worked, the eccentric cylindrical peripheral surface being on said cylindrical wall.

4. A chucking fixture as set forth in claim 2 wherein the collet member has internal screw threads in the bore adapted to correspond in size to a threaded shank of a fitting to be received therein in response to spreading of the slotted collet member to receive a threaded fitting shank.

5. A chucking fixture as set forth in claim 4 wherein the collet member has shoulder portions defined by an annular flange extending radially outwardly relative to the peripheral surface portion.

6. In combination a chucking fixture and rotatable chuck for threaded fittings for centering same during truing operations on seating portions comprising,
 (a) a rotatable chuck member of a lathe and the like and having clamping surfaces substantially equally spaced from the longitudinal axis of rotation, means in said chuck member and operable to move the clamping portions selectively toward and away from said axis,
 (b) a collet member having a bore on a longitudinal axis thereof, said bore having internal surfaces adapted to receive a shank of a fitting,
 (c) said collet member having a peripheral surface portion eccentric with respect to the longitudinal axis of said bore, said peripheral surface portion being adapted to be positioned within and engaged by the clamping portions of the chuck member,
 (d) said collet member being slotted for the length thereof with the slot extending from the periphery diametrically through and beyond said longitudinal bore, said slot normally having parallel sides,
 (e) the eccentric peripheral surface being cylindrical and the internal surfaces of the bore substantially corresponding to the shank of a fitting to be received therein only when portions defining the slot are spread apart at its outer portion, the internal surface of the bore and the peripheral surface being non-cylindrical when the collet is in its free or relaxed state, said peripheral surface of the collet member is adapted to be positioned in the chuck member and compressed thereby to clamp a workpiece portion in said bore, the concentricity of such a workpiece with respect to the rotational center of the chuck member being adjustable by relative rotation between said collet member and said chuck member to accurately center said workpiece.

7. A chucking apparatus as specified in claim 6 wherein said collet member has an annular flange forming a shoulder for engaging the clamping portions of the chuck member to position the collet member relative thereto and the internal surfaces of the bore of the collet member are internal screw threads for receiving a threaded shank of a fitting to be worked.

8. A chucking assembly as set forth in claim 4 wherein said collet member has a wall with the threaded bore therein and the peripheral surface portion eccentric to the axis of the bore is on a wall extending from the first named wall and cooperating therewith to define a generally cup shaped recess for receiving a fitting to be worked with the threaded bore adapted to receive a threaded shank of a fitting.

References Cited

UNITED STATES PATENTS

| 2,576,350 | 11/1951 | Mazzola | 279—6 |
| 2,643,556 | 6/1953 | Briney | 279—6 XR |

ROBERT C. RIORDON, Primary Examiner

D. D. EVENSON, Assistant Examiner